Figure 1:
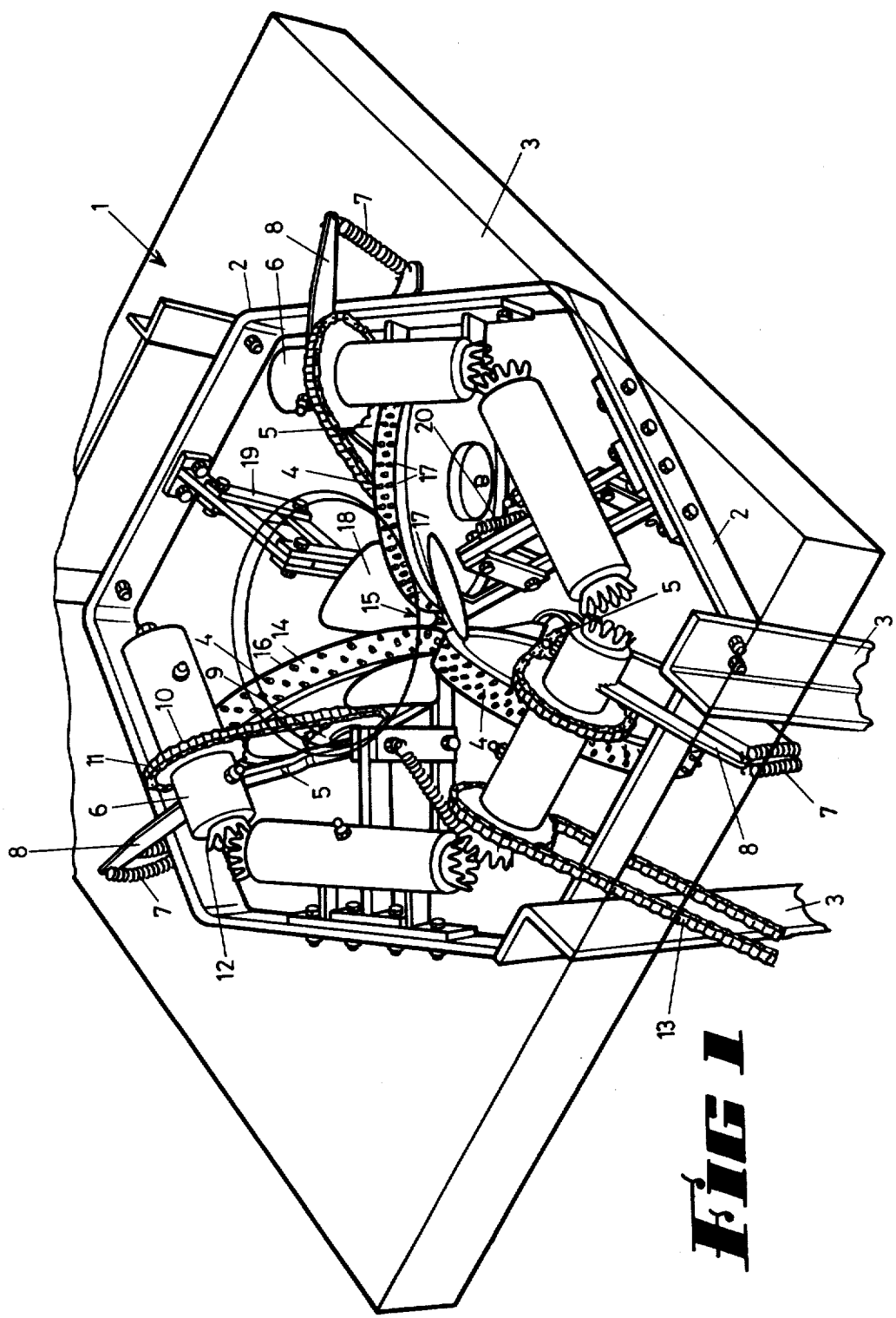

United States Patent [19]

Black

[11] 4,446,782
[45] May 8, 1984

[54] BANANA PEELING MACHINE

[76] Inventor: Leslie Black, 21 Awatea, St. Ives, 2075 N.S.W., Australia

[21] Appl. No.: 420,906

[22] Filed: Sep. 21, 1982

[30] Foreign Application Priority Data

Sep. 24, 1981 [AU] Australia .................. PF0912

[51] Int. Cl.³ ............................................. A23N 7/00
[52] U.S. Cl. .......................................... 99/589; 99/590; 99/591
[58] Field of Search ............................ 99/539–541, 99/567, 584, 587, 588–592; 426/482

[56] References Cited

U.S. PATENT DOCUMENTS

| | | | |
|---|---|---|---|
| 1,430,124 | 9/1922 | Stanley | 99/590 |
| 1,827,869 | 10/1931 | Casey | 99/590 |
| 2,800,937 | 7/1957 | Bardini | 99/590 |
| 3,451,451 | 6/1969 | Polk, Jr. | 99/587 X |
| 3,482,615 | 12/1969 | Green et al. | 426/482 |
| 3,627,011 | 12/1971 | Pond | 426/482 |

Primary Examiner—Timothy F. Simone
Attorney, Agent, or Firm—Pearne, Gordon, Sessions, McCoy, Granger & Tilberry

[57] ABSTRACT

A banana peeling machine in which the skin of a banana is engaged by impinging spikes on the periphery of three resiliently supported rotatable wheels with separating and cutting means adjacent a narrowest gap location to assist the skin being pulled away from the flesh to effect peeling of the banana.

10 Claims, 6 Drawing Figures

BANANA PEELING MACHINE

This invention relates to a method and apparatus for peeling of bananas.

Machines for this purpose have been proposed but these have had difficulties either in relation to the complexity of the machine, or their effectiveness, or the economy of manufacture.

Of these reference is made to the U.S. Pat. No. 3,627,011 in the name of Universal City Studios, Inc.

The machine disclosed in that particular Patent specification includes four rotating wheels having a plurality of suction pads around the outer circumference of each of these and the skin of the banana is necessarily to be cut with four slits longitudinally along the banana.

The banana must then be orientated correctly with respect to such cuts and passed through the machine from whence the peel will be stripped.

While the cutting of the peel could be manually achieved, none the less it does require a significant manual step prior to introduction of the banana into the peeling machine and hence reduces its effectiveness in a significant way.

Moreover the complexity of the machine including as it does a number of suction pads in which apertures exist which can be readily blocked with debris resulting from the peeling action, and the difficulty of controlling the degree of suction especially when the peel does not adequately close across the suction pad at the correct instant all lead to difficulties and complexities which are seen as a difficulty.

The object of this invention is to propose a banana peeling machine that can effect a peeling of a banana with a minimal amount of manual labour and can achieve this both quietly and economically and that a machine can be produced that can be reliable mechanically.

According to this invention there is proposed a banana peeling machine including at least three members each having a gripping face with means on the face to grip by engagement thereinto the skin of a banana, the location and arrangement of each member being such as to provide a narrowest gap between the gripping faces of the said means, cutting means between each of the members at or about the narrowest gap to cut the skin of the banana along its longitudinal direction as it passes in a longitudinal direction through the narrowest gap, and drive means to move each of the members to engage and thereby pull a banana through the narrowest gap.

Although in a preferred arrangement the said three or more members would comprise wheels, in a broader concept, this need not necessarily be the case provided that the functional features described are offered.

Accordingly, in its broadest form, such members could each comprise a belt with a plurality of outwardly extending spikes the belt being arranged to provide appropriate means to grip by engagement into the skin of the banana on its face.

Preferably, however, each of the members is constituted by a wheel the gripping face of which is an outer most circumference of the wheel.

Preferably each of the members is supported so as to be movable, or have their gripping face movable, when under pressure, away from the narrowest gap location.

Preferably, each of the cutting means is constituted by being a blade supported so as to be movable under pressure away from the narrowest gap locality.

Preferably, the gripping face is constituted by including a plurality of outwardly extending spikes adapted to impress at least partially through and thereby grip the skin of a banana.

Preferably, there are provided separating means adapted to scrape and thereby lift off skin subsequent to this being pulled from the banana flesh away from the gripping face.

These and other features will now be discerned by reference to the accompanying detailed description of a preferred embodiment and claims.

Figure 2:
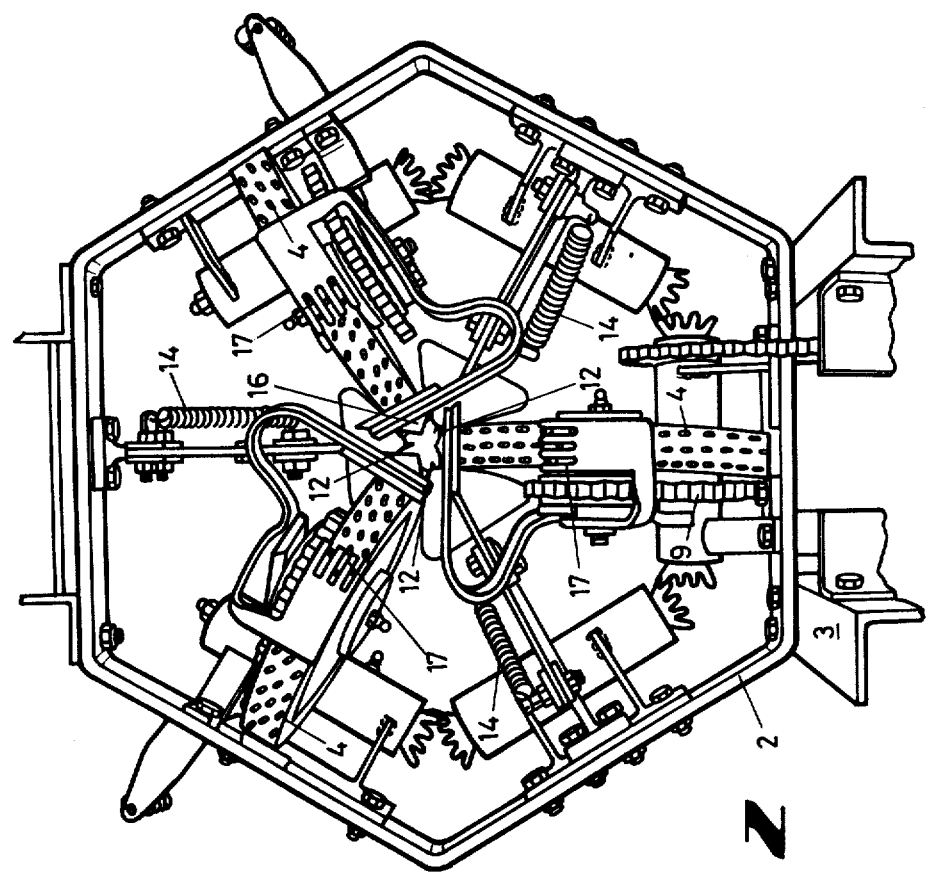
Figure 3:
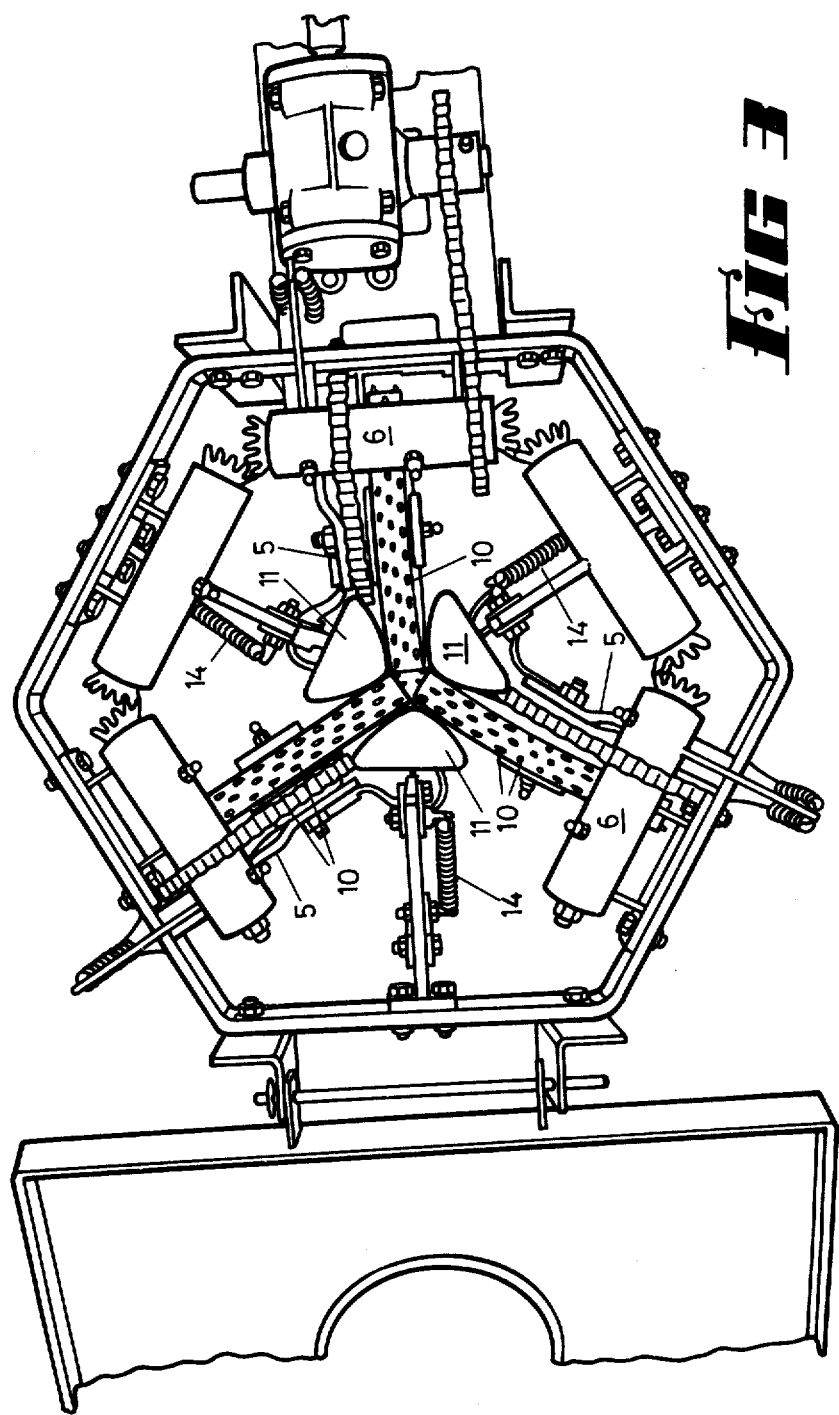
Figure 4:
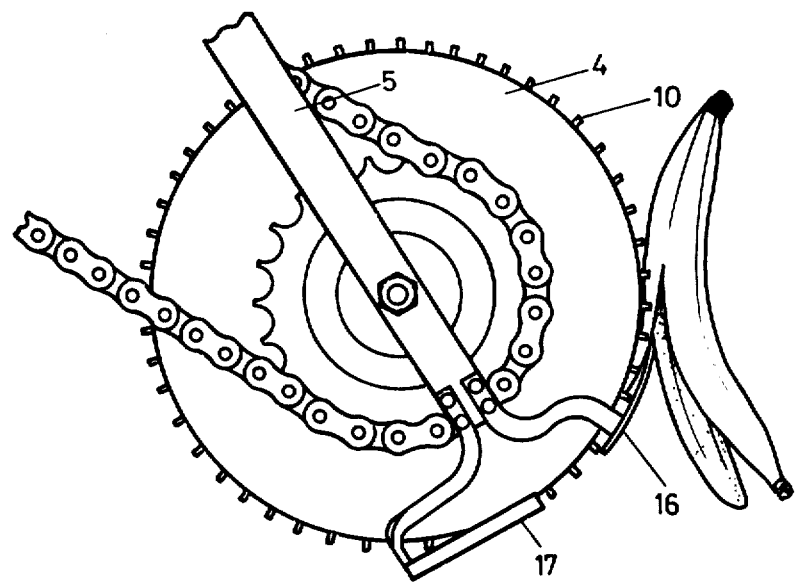
Figure 5:
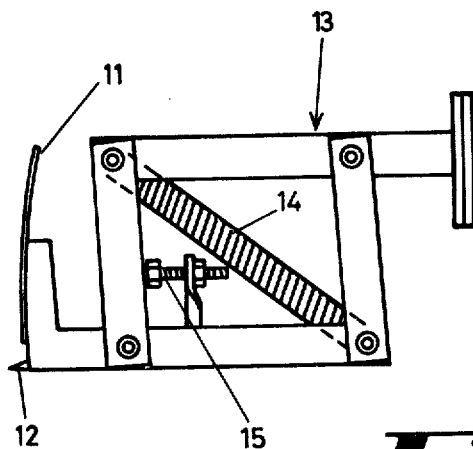
Figure 6:
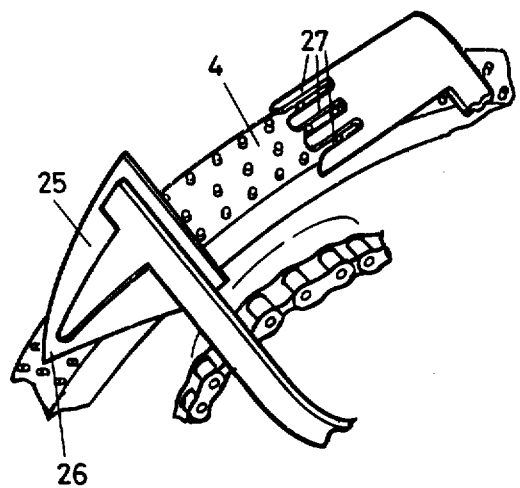

Referring to the preferred embodiment this shall now be described with the assistance of drawings in which:

FIG. 1 is a perspective view of the preferred embodiment with an upper protective guard being shown only in outline, FIG. 2 is a view of the same apparatus in FIG. 1 in this case however being viewed from immediately above within this case the upper most protective guard not being shown, FIG. 3 is a view of the same apparatus as in FIGS. 1 and 2 being viewed from below the apparatus, FIG. 4 is a side elevation of one of the portions of the apparatus as is shown in FIGS. 1, 2 and 3 showing specifically the means to hold the skin of a banana as it is being cut against the engaging pins on the wheel and furthermore the means to separate the skin from the periphery of the wheel subsequently, FIG. 5 is a side elevation of a support arrangement for a guide shield and lowermost blade this being according the the preferred embodiment as shown in the preceeding FIGS., and, FIG. 6 is a perspective view of a portion of the wheel showing in more detail features of the gripping fingers.

Referring now to the drawings which in some respect are schematic, there is shown a banana peeling machine 1 which includes a frame 2 which is arranged to support among other members, an upper platform with central aperture 3.

The machine 1 includes three wheels 4 each of which are identical and each of which are pivotally supported by a support arm 5.

The support arm 5 in each instance is in itself pivotally supported by housing 6.

The location of each of the wheels 4 is such that these are orientated one with respect to the other so that their axis are at one hundred and twenty degrees relative to the axis of the other two axis and these also are arranged at common height so that these act together.

The position of each of the wheels 4 is governed by in each case a helical spring 7 acting through lever arm 8 which in turn causes rotation of the housing 6 thereby urging the wheel 4 in each case toward a narrowest gap position.

Each of the wheels 4 is coupled so as to be able to be rotatably driven by means in each case of a sprocket 9 being connected through chain 10 to a sprocket 11 which is independently rotatable from housing 6 through a shaft not shown but coupled to sprocket 12.

The respective sprockets 12 coupled through common axis and interlinks to be collectively driven through chain drive 13 so that all of the sprockets 11 and hence wheels 4 are driven at the same speed in a forward direction that is in a direction so that the wheels have their outer circumference 14 at the converging position 15 moving in a downward direction.

The converging position 15 is also the narrowest gap position through which a banana to be peeled is directed.

Each of the wheels is coupled to sprocket 9 so that it will free wheel relative to the sprocket 9 when pushed at a faster rate in the location of the narrowest gap area downwardly.

The purpose of this feature is to allow one or several of the wheels in some instances to actually move faster than the driven rate for instance to allow for the speed of one side of the banana to be greater than the other in the instance where a banana is a curved shape.

The outer periphery of each of the wheels 4 is constituted by a surface being of cylindrical shape at 16 which has a plurality of spikes 17 arranged in three rows protruding from this cylindrical surface 16 the shape and size of each of the spikes 17 being such that these will on adequate pressure impinge into the skin of the banana but will not pass substantially through the skin of a banana and these spikes will further more be of sufficient closeness to therefore adequately grip and pull the skin of the banana by reason of this ingression.

There are therefore a sufficient number and shape of such spikes to achieve the purpose the drawing being shown to illustrate the type of spikes and the general shape and distribution but being drawn slightly larger to facilitate observation of these in a drawing of the scale but not being intended to definitely detail a specific size and shape of spike most suited for any particular case.

This can however by very easily achieved in any instance by simple experimentation.

The spikes should generally be equivalent in depth to the skin of a banana and be sufficiently spaced to allow for pressure against the skin to ensure the spikes themselves enter through the skin but do not unduly squash the flesh of the banana in this action.

It indeed has been a surprising feature of the development that spikes of this type with adequate pressure can achieve this.

Obviously the setting and location of spring 7 in each case facilitates the pressure in conjunction with the size of the spikes.

The action of the three wheels then being driven forwardly so that the spiked outer circumferance is going downwardly is to grip the outer surfaces of the banana as it is fed from the top and pull this toward a narrowest gap location at which there is maximum pressure to insert the spikes into the skin of the banana.

Three additional functions are then effected a first of these being achieved by blades 17A which are at the lower end of a diverter guide 18.

The blade 17A in each case is supported by a linkage assembly at 19 which includes a spring load 20 such that the blade is urged inwardly and generally at or about the narrowest gap location the linkage assembly 19 being such that with increasing downward pressure on the blade 17 this will cause the blade to slightly retract from the narrowest gap location.

The location of each of the blades is once again at a one hundred and twenty degrees direction one with respect to the other so that these are located between the gaps of the respective wheels 4.

The linkage assembly 19 is shown in more detail in FIG. 5 there being further more shown a variable stop member 21 which is supported by arm 22 with screw stop member 23 acting against an inner side of the lever arm 24.

In this way the inner most position of the blade 17A can be determined.

The function then of the blades 17A is to slit the outer skin of the banana as it passes through the narrowest gap position but to slit generally only the skin and not to pass into the flesh of the banana.

After the skin of the banana passes the narrowest gap position and has had a slit effected by reason of each of the blades, it is necessary that the skin be pulled from the flesh and kept against the outer periphery of each wheel 4 and to assist in this effect, there is provided a guide 25 the shape of which is most readily perceived at FIG. 6 the upper end 26 of this being pointed so as to assist in ensnaring the skin and separating this from the flesh.

As the skin then continues around the periphery of the wheel 4 it is removed by reason of fingers 27 which slide against the cylindrical surface of the wheel 4 effectively lifting the skin away and of course leaving this to fall to a deposit area.

Both the guide 25 and the cleaning fingers 27 are supported on a common support arm 28 as shown most particularly in FIGS. 4 and 6.

It will now be seen that by rotation of the respective wheels 4, by reason of drive through chain 13, when a banana preferably with an end cut off, is inserted with this end downward most this will firstly be gripped by the respective spikes 17 are pulled toward the narrowest gap location under pressure caused by the respective springs 7.

Such pressure is sufficient to cause the spikes to enter into the skin of the banana and thereby hold the skin with substantial force and as the banana is thus pulled past the narrowest gap location, the three blades 17 act to split the skin into three separate segments and the guide 25 which is located beneath each of the wheels 4 will act to pare the skin from the flesh and hold this against the periphery of the wheel 4.

Subsequent removal of the skin segment in each case is effected by the fingers 27 and effected deposition in a conventional way.

If the banana is a curved shape, the over-run facility in respect of each wheel 4 allows for one wheel to take the drive while the others can go faster without undue damage of the banana which perhaps could be otherwise effected.

This then describes the banana peeling machine according to the preferred embodiment.

It will be seen from this that a machine can be produced which can be operated simply by one rotational drive through the chain connection 13 and it has been found that the operation of the machine is more or less noiseless and of course the machine in manufacture and in operation is very economic.

I claim:

1. A banana peeling machine including at least three members each having a gripping face with means on the face to grip by engagement and penetration thereof the skin of a banana as it is moved in the direction of its longitudinal axis, the location and arrangement of each member being such that said gripping faces converge toward one another to provide a gap therebetween including a location of narrowest gap through which the banana to be peeled is passed with said gripping faces engaging and at least partially penetrating the skin of the banana, cutting members between each of the members at or near the narrowest gap to cut the skin of the banana along its longitudinal direction as it passes through the narrowest gap, the skin of the banana being retained and pulled from the banana flesh by the gripping faces as the banana moves away from the location of the narrowest gap, and drive means to move each of the members to engage and thereby pull a banana between the gripping faces and through the narrowest gap.

2. A banana peeling machine as in claim 1 in which each of the members in constituted by a wheel the gripping face of which is an outermost circumference of the wheel.

3. A banana peeling machine as in either of claims 1 or 2 wherein each of the members is supported so as to be movable under pressure away from the narrowest gap.

4. A banana peeling machine as in claim 3, in which each of the cutting members is constituted by a blade supported so as to be movable under pressure away from the narrowest gap.

5. A banana peeling machine as in either of claims 1 or 2 in which each of the cutting members is constituted by a blade supported so as to be movable under pressure away from the narrowest gap.

6. A banana peeling machine as in either of claims 1 or 2 wherein the gripping face means includes a plurality of outwardly extending spikes from the face which spikes are adapted to enter into the skin of the banana and thereby grip the skin of the banana as it passes through the narrowest gap.

7. A banana peeling machine as in either of claims 1 or 2 wherein the gripping face means includes a plurality of outwardly extending spikes from the face which spikes are adapted to enter into the skin of the banana and thereby grip the skin as it passes the narrowest gap locality, and separating means adapted to scrape each gripping face subsequent to engagement and separation of a banana skin from the flesh adapted thereby to separate the skin from the gripping face.

8. A banana peeling machine as set forth in claim 2, wherein each of said wheels is arranged so that its outer circumference moves arcuately away from the direction of movement of the banana as the banana moves away from the location of the narrowest gap.

9. A banana peeling machine including at least three members each comprising a wheel having an outermost circumference including a plurality of radially extending spikes adapted to act as a gripping face to grip by engagement under pressure and at least partial penetration the skin of a banana to be peeled as it is moved in the direction of its longitudinal axis, the three members being arranged symmetrically such that said gripping faces converge toward one another to provide a gap therebetween including a narrowest gap locality through which the banana to be peeled is passed with said gripping faces engaging and at least partially penetrating the skin of the banana, means supporting each of the members urging each of the members with resilient pressure towards the narrowest gap locality, drive means effective to drive each of the members to engage and pull a banana toward the narrowest gap locality, cutting means including a blade located between each of the members, supported so as to be resiliently urged toward the narrowest gap locality and positioned whereby to cut the skin of a banana as it passes through the narrowest gap locality, the skin of the banana being retained and pulled from the banana flesh by the gripping faces as the banana moves away from the narrowest gap locality, and separating means to separate the skin of a banana from each of the gripping faces subsequent to removal from the banana flesh.

10. A banana peeling machine as set forth in claim 9, wherein each of said wheels is arranged so that its outer circumference moves arcuately away from the direction of movement of the banana as the banana moves away from the narrowest gap locality.

* * * * *